United States Patent
Bürkert et al.

(10) Patent No.: US 11,811,270 B2
(45) Date of Patent: Nov. 7, 2023

(54) DEVICE FOR CONTINUOUS OSCILLATION MONITORING DURING ROTATING FIELD MACHINE OPERATION

(71) Applicant: ebm-papst Mulfingen GmbH & Co. KG, Mulfingen (DE)

(72) Inventors: Martin Bürkert, Dörzbach-Hohebach (DE); Hartmut Messerschmidt, Ingelfingen (DE); Christian Antonius Knipp, Aspach (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 199 days.

(21) Appl. No.: 16/808,893

(22) Filed: Mar. 4, 2020

(65) Prior Publication Data

US 2020/0287433 A1   Sep. 10, 2020

(30) Foreign Application Priority Data

Mar. 6, 2019 (DE) ...................... 10 2019 105 692.6

(51) Int. Cl.
*H02K 1/32* (2006.01)
*H02K 1/16* (2006.01)
*H02K 3/28* (2006.01)
*G01L 5/00* (2006.01)

(52) U.S. Cl.
CPC .............. *H02K 1/32* (2013.01); *H02K 1/165* (2013.01); *H02K 3/28* (2013.01); *G01L 5/0009* (2013.01)

(58) Field of Classification Search
CPC . H02P 23/04; H02K 3/28; H02K 1/32; H02K 1/165; G01L 5/0009

USPC ........................................................ 310/40 R
See application file for complete search history.

(56) References Cited

U.S. PATENT DOCUMENTS

| | | | | |
|---|---|---|---|---|
| 5,277,063 A | * | 1/1994 | Thomas | G01M 1/22 73/457 |
| 5,765,402 A | * | 6/1998 | Ikeda | D06F 33/40 68/12.06 |
| 8,587,250 B2 | * | 11/2013 | Villwock | H02P 21/16 318/400.15 |
| 2013/0063060 A1 | * | 3/2013 | Dorner | H02P 6/15 318/400.14 |
| 2016/0279776 A1 | * | 9/2016 | Wirnitzer | B25D 11/005 |
| 2018/0278188 A1 | * | 9/2018 | Zhang | H02K 7/1823 |
| 2020/0052624 A1 | * | 2/2020 | Gohring | H02P 7/291 |

FOREIGN PATENT DOCUMENTS

| | | | | |
|---|---|---|---|---|
| DE | 69714102 T2 | 11/2002 | | |
| DE | 102011101599 A1 | * | 11/2012 | ............... G01H 1/00 |
| DE | 102016119826 A1 | * | 4/2018 | ............... H02P 7/291 |
| DE | 102017107384 A1 | 10/2018 | | |
| DE | 112017001119 T5 | 11/2018 | | |
| EP | 1972793 A1 | 9/2008 | | |
| WO | 2006127939 A2 | 11/2006 | | |

(Continued)

*Primary Examiner* — Alex W Mok
(74) *Attorney, Agent, or Firm* — Dickinson Wright PLLC

(57) ABSTRACT

A rotating field machine, in particular an electric motor with a stator and a rotor, is configured with a motor control for controlling the rotation and the rotational speed n of the rotor of the rotating field machine, wherein the motor control integrally includes an oscillation sensor system in order to acquire actual measurement values of oscillations of the rotating field machine depending on the rotational speed n.

11 Claims, 2 Drawing Sheets

(56) References Cited

FOREIGN PATENT DOCUMENTS

| WO | WO-2008141789 A2 * | 11/2008 | ............. B06B 1/045 |
|----|--------------------|---------|--------------------------|
| WO | 2013087708 A2 | 6/2013 | |
| WO | 2017011568 A1 | 1/2017 | |

* cited by examiner

DEVICE FOR CONTINUOUS OSCILLATION MONITORING DURING ROTATING FIELD MACHINE OPERATION

CROSS REFERENCE TO RELATED APPLICATIONS

This application claims the benefit of priority under 35 U.S.C. § 119 to German Patent Application No. 10 2019 105 692.6, filed Mar. 6, 2019, the content of which is incorporated herein by reference in its entirety.

FIELD

The invention relates to a device for oscillation monitoring of a rotating field machine.

BACKGROUND

The statements in this section merely provide background information related to the present disclosure and several definitions for terms used in the present disclosure and may not constitute prior art.

In the prior art, various methods are already known for making diagnoses concerning manufacturing machines, production installations or motors and their temporal behavior. The installation availability of a rotating machine such as, for example, a motor, a blower or fan represents an important factor for the economical use of this device.

The main object of a method for monitoring the status of machines and motors, in particular rotating or rotatable machines and motors, consists in enabling, to the extent possible without interruption of the operation, an evaluation of the current machine state, of the load on the machine and of any changes of the status of the machine concerning its oscillation behavior and true running. Machine status is understood to mean here, inter alia, the evaluation of the oscillation behavior of the machine based on certain operating parameters.

In rotating field machines, for example, irregular mass distribution can result in a circumferential radial force component which leads to vibrations and oscillations (in particular at certain rotational speeds) and increased wear of the machine.

Thus, for example, methods are known for monitoring continuously moving and/or rotating machine parts, in particular machine bearings, by analysis of oscillation patterns by means of sensors. The oscillation monitoring systems necessary for this purpose measure the vibration over a prolonged time period and output, for example, a direct error message in case the total oscillation level overshoots a limit value.

In such methods, it is disadvantageous, on the one hand, that it is only in the case of a concrete overshooting of limit value parameters that a detection occurs, and, on the other hand, it is also difficult to estimate where the change in oscillation behavior comes from. But it is particularly disadvantageous that one cannot have a direct influence on the regulation behavior of the motor, in order to basically eliminate the oscillation which may have been produced by intrinsic oscillation behavior and not by an imbalance. Thus, depending on rotational speed and load, undesired oscillations, for example, in the range of the intrinsic oscillations or the resonance frequencies, continue to occur at certain rotational speeds.

Known solutions are typically based on the principle of a temporary oscillation analysis by means of external electronics. Here, in addition to the sensor system for acquiring the oscillation, an additional measurement device for acquiring the rotational speed is always necessary. Moreover, the actuation of the electric machine usually occurs completely independently of the electronics for the oscillation analysis and it involves components without technical interaction which concretely are designed to acquire an oscillation by metrological means. Due to the high market prices of such devices, these analysis units are not installed permanently. For example, only temporary measurements over a certain time interval or at certain measurement times are carried out and analyzed. Here, it must be taken into consideration that the mass-spring system of the rotating field machine can already be influenced by the application of the measurement equipment to the rotating field machine, and a result different from the result without the presence of the measurement device is obtained.

If the oscillation analysis was carried out successfully, then additional measures have to be carried out and these measures have to be supplied via an external or internal controller to the system. In order to achieve this, in the prior art, for example, a separate adaptation or conversion of the data is carried out in order to then be able to evaluate this data by control technology. Rotational speed run-ups which are necessary for the measurement moreover have to be controlled separately by the user. If the analysis is completed, it is at first unclear how one can eliminate the oscillation. Possibly a replacement of the device (blower/motor) or a reworking (for example, balancing or stiffening of the structure) is necessary.

SUMMARY

Therefore, starting from the prior art, the objective of the present disclosure is to overcome the above-mentioned disadvantages and to propose a device and a method which enable a simple and reliable monitoring and detection of the oscillation behavior of a rotating machine or rotating field machine, wherein, in particular, corresponding measures for preventing an oscillation behavior are provided.

This object is achieved by a rotating field machine, in particular an electric motor with a stator and a rotor, configured with a motor control for controlling at least the rotation and the rotational speed n of the rotor of the rotating field machine, wherein the motor control integrally comprises an oscillation sensor system in order to acquire actual measurement values of occurring oscillations of the rotating field machine depending on the rotational speed n.

According to one aspect of the present disclosure, a basic idea consists in configuring the motor control itself so that an oscillation analysis is integrally present in the motor control and an external sensor system can be dispensed with entirely.

For this purpose, the integration of the oscillation sensor system occurs directly on the printed circuit board of the motor electronics or electronics of the rotating field machine. By the integration in the motor electronics, a continuous oscillation monitoring and a direct adaptation of control parameters of the motor, such as, for example, the rotational speed of the motor, are possible.

Operating information such as, for example, the rotational speed, is obtained in any case from the conventional motor control. By the integration of the oscillation monitoring in the motor electronics, measurements (for example, rotational speed run-up for resonance determination) initiated manually beforehand and evaluated can be fully automated by control technology.

With the device according to the present disclosure, in particular for sensor diagnostic monitoring of a rotating field machine in rotation, it becomes possible to automatically detect, during running operation, status information on the oscillation behavior of the rotating machine, in particular a dynamic resonance oscillation at a certain rotational speed, and to optionally eliminate this rotational speed as unacceptable rotational speed from the set or range of possible operating rotational speeds.

Proposed for this purpose according to the present disclosure is a rotating field machine, in particular an electric motor with a stator and a rotor, which is configured with a motor control for controlling the rotation and the rotational speed n of the rotor of the rotating field machine, wherein the motor control integrally comprises an oscillation sensor in order to acquire actual measurement values of oscillations of the rotating field machine depending on the rotational speed n.

According to another aspect of the present disclosure, it may be advantageous if the motor control integrally comprises means for the analysis of the actual measurement values of the oscillations acquired by the oscillation sensor system. Here, a single printed circuit board of the motor control can accommodate all the electronic components necessary for the control and diagnostic monitoring of the oscillation behavior of the motor. Furthermore, it may be advantageous if this motor control is directly integrated in the motor housing, so that no additional connection lines (supplied from outside) of a sensor system between motor, motor control and analysis units are necessary. The entire connection technology can then be accommodated integrally in the interior of the motor housing in a compact manner.

In an additional preferred design of the present disclosure, it is provided that the means for analyzing the actual values are configured so that, depending on stored target values and limit values, unacceptable oscillations at the corresponding rotational speeds are detected by the motor control. For this purpose, during a run-up of the motor, the unacceptable rotational speed values at which undesired or unacceptable oscillations and resonances occur can be detected and selected, and these rotational speed values are stored in the system memory, in such a manner that the motor control does not actuate these rotational speeds as unacceptable rotational speeds during operation.

Additionally, it can be provided that, under or over the respective discrete unacceptable rotational speed value, by means of the oscillation analysis, a rotational speed spectrum is determined, in which the oscillations which occur are smaller at least by a certain determined factor than the unacceptable oscillation amplitude which occurs at the discrete unacceptable rotational speed, wherein the rotational speed range thus determined is excluded in each case as unacceptable rotational speed range delimited by a lower value and an upper value.

According to another aspect of the present disclosure an additional design provides that the motor control comprises at least one processor coupled to an oscillation sensor by signal technology and which processes the information obtained from the control command into system parameters which are then used for actuating the motor during operation.

Advantageously, the rotating field machine is an electric motor of a fan or of a blower, so that fans and blowers are in this manner continuously monitored and controlled with regard to their oscillation behavior.

An additional aspect of the present disclosure relates to a method for operating such a rotating field machine or such an electric motor, wherein the motor control is configured to control the rotating field machine with the following operating conditions:

$$\text{rotational speed n: } 0 < n \leq n_{max} \quad \text{i)}$$

(the rotational speed must be lower than a predetermined maximum acceptable rotational speed) and $$n \neq n_{unz} \quad \text{ii)}$$

wherein $n_{unz}$ represents all the rotational speeds not acceptable for the use according to the intended purpose and said unacceptable rotational speeds are determined during a run-up of the rotating field machine as follows:
  a) acquisition of the actual measurement values of the oscillation behavior with the oscillation sensor system, starting from a standstill of the rotating field machine, by continuous increasing of the rotational speed n;
  b) wherein, when an unacceptable actual measurement value is detected at a certain rotational speed $n_i$, in comparison to the acceptable target measurement values, the motor control stores this rotational speed $n_i$ as unacceptable rotational speed $n_{unz}$ for the operation according to the intended purpose of the rotating field machine, in a system memory;
  c) wherein the increasing of the rotational speed n and the measures from step b) are repeated or continued until the maximum acceptable rotational speed $n_{max}$ has been reached.

A run-up in the sense of the present disclosure is understood to mean the starting of the electric motor from a standstill with increasing of the rotational speed. This measurement run can be executed once at the beginning, sporadically, or during each increase of the motor to the target rotational speed. Alternatively, the measurement run can also be acquired in each case during the shutting down or running down. For this purpose, the described steps have to be carried out in reverse, and the rotational speed is not increased rather decreased.

An additional aspect of the present disclosure relates to a method for operating such a rotating field machine or such an electric motor, wherein the motor control is configured to control the rotating field machine with the following operating conditions:

$$\text{rotational speed n: } 0 < n \leq n_{max} \quad \text{i)}$$

$$n \neq n_{unz} \quad \text{ii)}$$

wherein $n_{unz}$ represent all the rotational speeds which are unacceptable for the use according to the intended purpose and these unacceptable rotating speeds are determined during a run-up of the rotating field machine as follows:
  a) acquisition of the actual measurement values of the oscillation behavior with the oscillation sensor system starting from the maximum rotational speed or an actual rotational speed of the rotating field machine by continuous decreasing of the rotational speed n to a standstill;
  b) wherein, when an unacceptable actual measurement value is detected at a certain rotational speed $n_i$, in comparison to the acceptable target measurement values, the motor control stores this rotational speed $n_i$ as unacceptable rotational speed $n_{unz}$ for the operation according to the intended purpose of the rotating field machine, in a system memory;
  c) wherein the decrease of the rotational speed n and the measures from step b) are repeated or continued until a standstill has been reached.

Thus, in a subsequent operating stage, it is also ensured that certain rotational speeds are detected as unacceptable rotational speeds for the operation according to the intended purpose and are eliminated. For example, it is conceivable that the motor changes in terms of its operating behavior due to wear or other influences or that undesired oscillations occur after a longer operating time at a certain rotational speed which was not problematic during the start-up of the motor. Thus, a continuous monitoring of the oscillation behavior over the entire rotational speed range of unacceptable rotational speeds of the electric motor is achieved.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
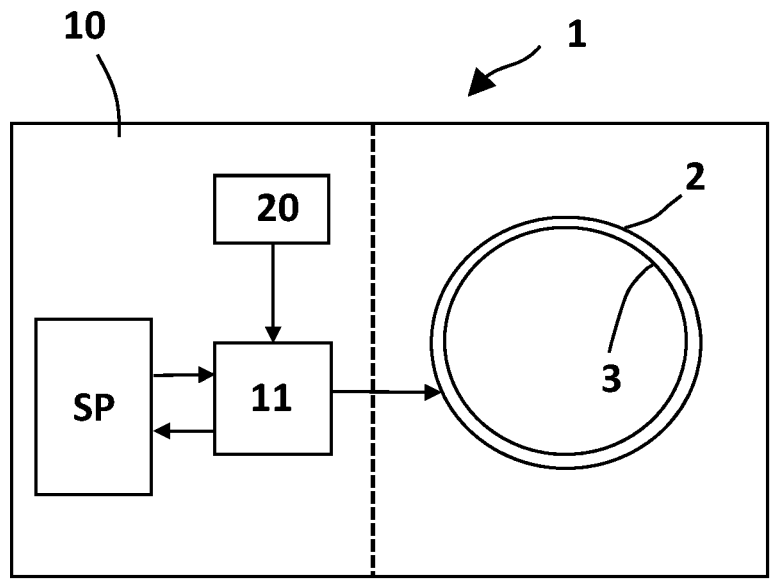
FIG. 1 shows a diagrammatic circuit sketch of the device according to the invention.

Below, the invention is explained in further detail in reference to FIG. 1 to FIG. 3 with an embodiment example, wherein identical reference numerals refer to identical structural and/or functional features in the figures. The drawings are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or corresponding parts and features.

FIG. 1 is a diagrammatic circuit sketch of the device according to invention, here an electric motor 1. The electric motor 1 has a rotor 2 and a stator 3. Furthermore, the electric motor 1 has a motor control 10 for controlling the rotational speed n of the rotor 2.

The motor control 10 integrally comprises an oscillation sensor system 20 for acquiring actual measurement values of oscillations of the electric motor 1 depending on the rotational speed n.

SP designates the system parameters with which the motor control 10 controls the operation of the motor 1 by means of a processor 11. As system parameters SP, the rotational speed n and the maximum acceptable rotational speed $n_{max}$ should be mentioned, for example. Furthermore, system parameters SP which were obtained due to the oscillation analysis are stored as operating parameters, such as the elimination ranges of the rotational speed, unacceptable rotational speeds $n_{unz}$, unacceptable oscillation.

Figure 3:
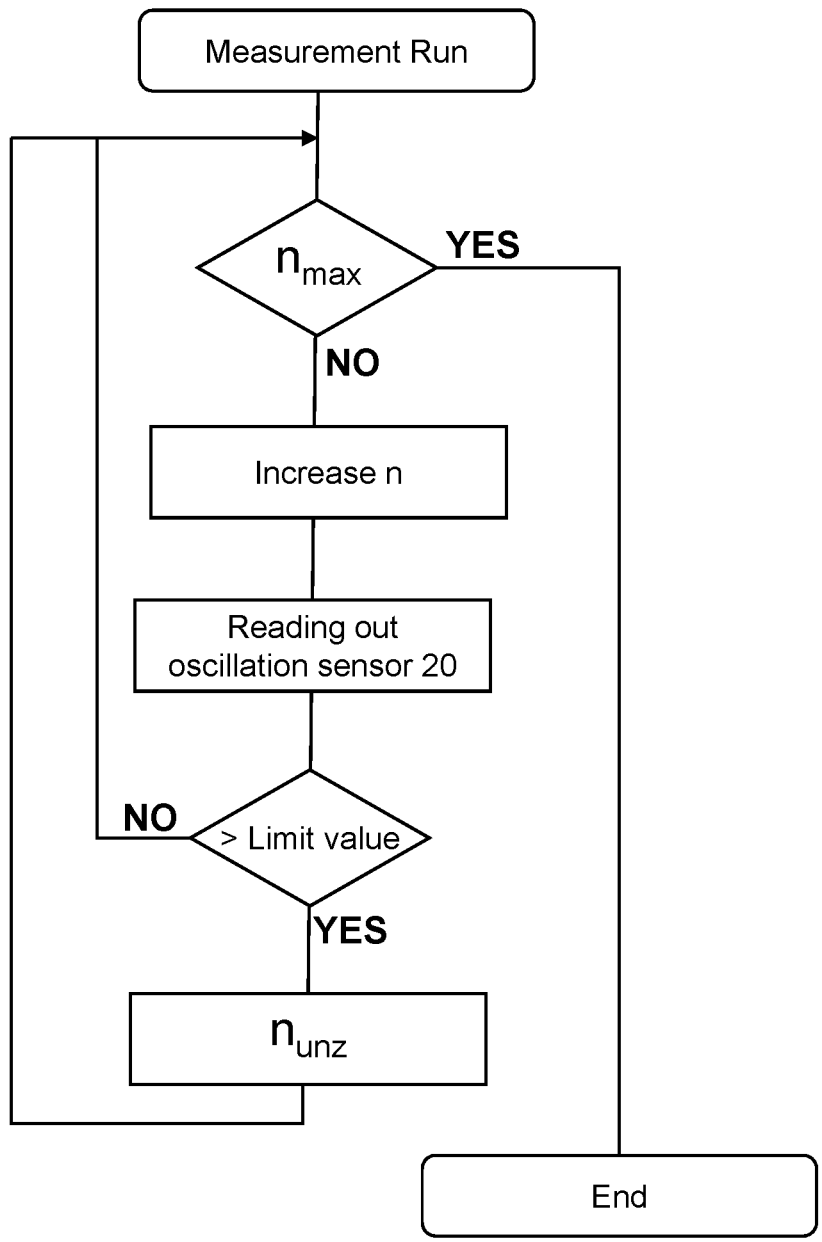
FIG. 3 shows a flow chart which demonstrates the measurement run.

FIG. 3 shows one measurement run which can be implemented with the idea of the present disclosure.

In the first step, the rotational speed n is increased from a standstill after the start of the motor 1. As long as the rotational speed n is less than the maximum acceptable rotational speed $n_{max}$, the rotational speed is increased until an undesirable oscillation status is detected during the reading out of the oscillation sensor 20. If no such measurement event occurs, then the motor 1 is run up to the maximum acceptable rotational speed $n_{max}$, and the measurement run ends, since no interfering oscillation statuses occurred.

As soon as, at certain rotational speed $n_i$, an acceptable (stored) limit value for the oscillation status has been exceeded, this rotational speed $n_i$ is stored as unacceptable rotational speed $n_{unz}$, and the loop continues to be run and in the process the rotational speed n is further increased until the maximum acceptable rotational speed $n_{max}$ has been reached. At the end of the entire measurement run, the rotational speeds $n_{unz}$ which are "to be eliminated" for the operation have been established.

Figure 2:
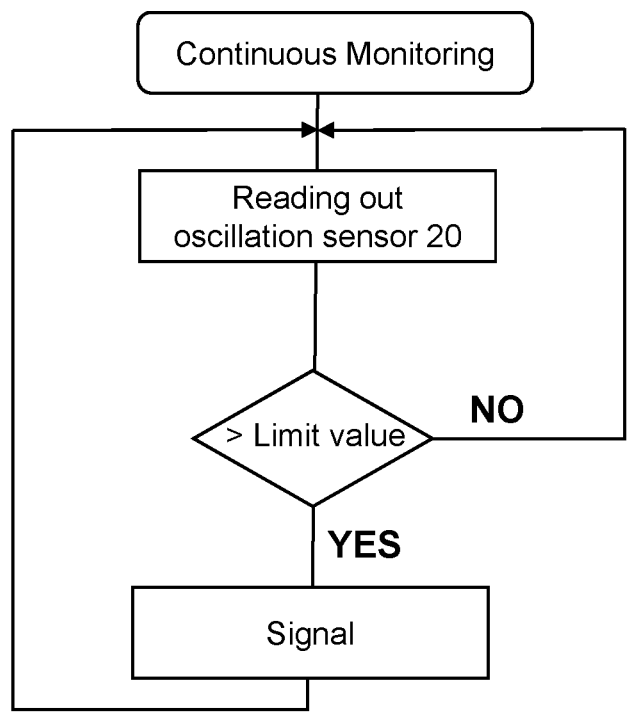
FIG. 2 shows a diagrammatic representation of the principle of the continuous oscillation monitoring.

In FIG. 2, the normal operation of the motor 1 is represented in the context of the continuous monitoring. The oscillation sensor 20 monitors the operation and the data of the oscillation sensor 20 is acquired regularly or continuously by the motor control 10. When a defined limit value is exceeded, a signal is generated, which can be processed in different ways by signal technology. For example, a warning message or a switch-off command for the motor 1 can occur. Alternatively, the motor control 10 can adapt the rotational speed n in accordance with an adaptation command until the limit value has again been undershot by a certain factor.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

While the above description constitutes the preferred embodiments of the present invention, it will be appreciated that the invention is susceptible to modification, variation and change without departing from the proper scope and fair meaning of the accompanying claims.

What is claimed is:

1. A rotating field machine having a rotor, and configured with a motor control for controlling at least the rotation and the rotational speed n of the rotor of the rotating field machine, wherein the motor control integrally comprises an oscillation sensor system configured to continuously monitor the oscillation behavior of the rotating field machine by acquiring actual measurement values of occurring oscillations of the rotating field machine depending on the rotational speed n during running operation and to directly adapt control parameters of the motor in relation thereto;
   wherein the motor control is configured for storing, depending on the actual measurement values of the oscillation sensor system at one or multiple determined rotational speeds $n_i$, said rotational speeds as rotational speeds $n_{unz}$ which are unacceptable for the motor control, in a system memory of the motor control, such that the motor control does not actuate these rotational speeds $n_{unz}$ during operation.

2. The rotating field machine according to claim 1, wherein the motor control integrally comprises means for the analysis of the actual measurement values of the oscillations acquired by the oscillation sensor system.

3. The rotating field machine according to claim 2, wherein the means for the analysis of the actual values are configured so that, depending on stored target values and limit values, unacceptable oscillations at the corresponding rotational speeds n are detected and/or processed by the motor control.

4. The rotating field machine according to claim 1, wherein the motor control comprises one or more printed circuit boards, on which an oscillation sensor of the oscillation sensor system is mounted.

5. The rotating field machine according to claim 4, characterized in that the motor control comprises at least one processor coupled by signal technology to the oscillation sensor.

6. The rotating field machine according to claim 1, wherein the motor control comprises at least one processor coupled by signal technology to an oscillation sensor.

7. The rotating field machine according to claim 1, wherein each of the rotational speeds $n_{unz}$ represents an unacceptable rotational speed range delimited by a lower value and an upper value.

8. The rotating field machine according to claim 1, wherein the rotating field machine is an electric motor of a fan or of a blower.

9. A method for operating a rotating field machine according to claim 1, wherein the motor control is configured to control the rotating field machine with the following operating conditions:
  i) rotational speed n: $0<n \leq n_{max}$
  ii) $n \neq n_{unz}$, such that $n_{unz}$ is not actuated during operation;
  wherein $n_{unz}$ represents all the rotational speeds not acceptable for the use according to intended purpose and said rotational speeds are determined during a run-up of the rotating field machine as follows:
  a) acquisition of the actual measurement values of the oscillation behavior with the oscillation sensor system, starting from a standstill of the rotating field machine, by continuous increasing of the rotational speed n;
  b) wherein, when an unacceptable actual measurement value is detected at a certain rotational speed $n_i$, in comparison to the acceptable target measurement values, the motor control stores this rotational speed $n_i$ as unacceptable rotational speed $n_{unz}$ for the operation according to the intended purpose of the rotating field machine, in a system memory;
  c) wherein the increasing of the rotational speed n and the measures from step b) are repeated or continued until the maximum acceptable rotational speed nmax has been reached.

10. A method for operating a rotating field machine according to claim 1, wherein the motor control is configured to control the rotating field machine with the following operating conditions:
  i) rotational speed n: $0<n \leq n_{max}$
  ii) $n \neq n_{unz}$, such that $n_{unz}$ is not actuated during operation;
  wherein $n_{unz}$ represent all the rotational speeds which are unacceptable for the use according to the intended purpose and these unacceptable rotating speeds are determined during a run-up of the rotating field machine as follows:
  a) acquisition of the actual measurement values of the oscillation behavior with the oscillation sensor system starting from the maximum rotational speed or an actual rotational speed of the rotating field machine by continuous decreasing of the rotational speed n to a standstill;
  b) wherein, when an unacceptable actual measurement value is detected at a certain rotational speed $n_i$, in comparison to the acceptable target measurement values, the motor control stores this rotational speed $n_i$ as unacceptable rotational speed $n_{unz}$ for the operation according to the intended purpose of the rotating field machine, in a system memory;
  c) wherein the decrease of the rotational speed n and the measures from step b) are repeated or continued until a standstill has been reached.

11. The rotating field machine according to claim 1, wherein the rotating field machine is an electric motor comprising a stator and the rotor.

* * * * *